Figure 1:
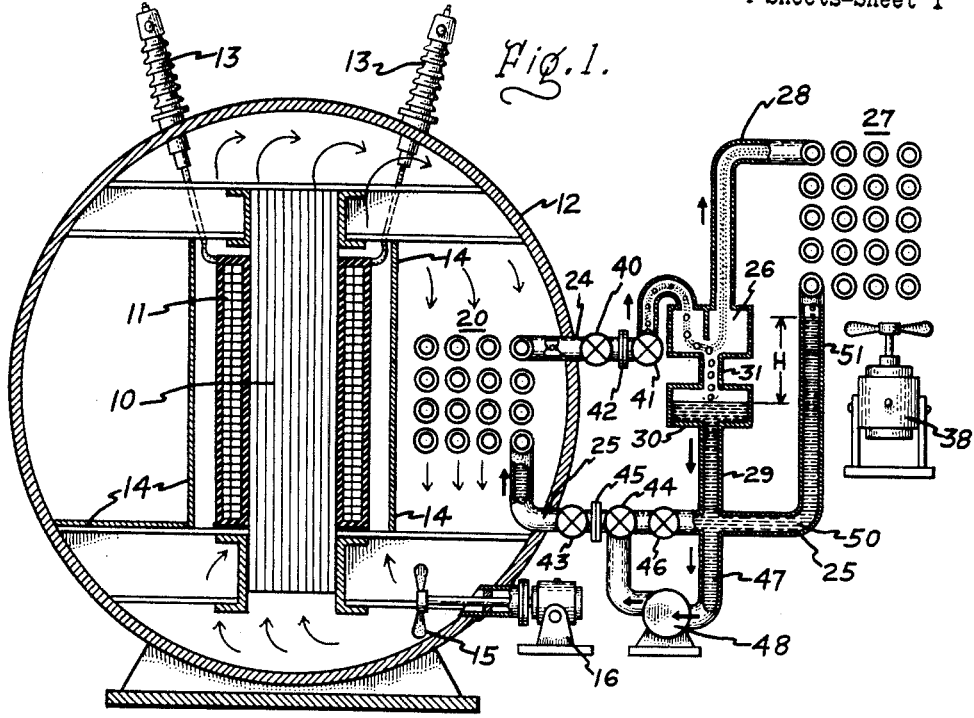

Inventors,
Guglielmo Camilli,
David R. Pryde,
by Gilbert P. Tarleton
Their Attorney.

Inventors,
Guglielmo Camilli,
David R. Pryde,
by [signature]
Their Attorney.

Inventors,
Guglielmo Camilli,
David R. Pryde,
by their Attorney.

Inventors,
Guglielmo Camilli,
David R. Pryde,
by
Their Attorney.

United States Patent Office

2,947,798
Patented Aug. 2, 1960

2,947,798

COOLING ARRANGEMENT FOR ELECTRIC APPARATUS

Guglielmo Camilli and David R. Pryde, Pittsfield, Mass., assignors to General Electric Company, a corporation of New York Filed Aug. 20, 1957, Ser. No. 679,293

10 Claims. (Cl. 174—15)

This invention relates to a cooling arrangement for electric apparatus, and more in particular to an improved arrangement for cooling electrical apparatus of the type immersed in a gaseous insulating medium. While the invention is disclosed with specific reference to stationary electric induction apparatus, such as transformers, it will be obvious that the invention may also be employed for cooling other types of electrical apparatus without departing from the spirit or scope thereof.

Recent advances in the art of manufacturing transformers include transformers encased in electronegative gas filled enclosures or tanks. The electronegative gases employed, such as sulfur hexafluoride, serve as an insulating and cooling medium for the transformer, and provide advantages such as reduced transformer weight as compared with oil filled transformers.

Among the problems encountered in the manufacture of gas insulated transformers, that of cooling the core and coils is of major importance. In previous electronegative gas insulated transformers, the cooling arrangements employed were substantially the same as their oil filled counterparts. More specifically, the transformers were enclosed in gas filled tanks, the gas being employed both as an insulator and a coolant. Fans were provided to circulate the gas through the core and coils of the transformers, and through an external cooler or radiator. Fans were also provided to force air across the external surfaces of the radiator. Thus, the dissipation of heat from the transformer was accomplished by heat transfer from the gas to air through the surfaces of the radiator.

While sufficient transfer of heat was accomplished, a number of disadvantages arose from the use of the above arrangement. Due to the widely different thermal characteristics of the electronegative gas and the external air, the external and internal surfaces of the radiator (in order to obtain the most efficient heat transfer) should be proportioned to be functions of the densities, pressures, and velocities of the gas and air. Although it may be possible to fabricate a radiator having surface ratios for optimum performance, the resulting structure would be required to have such dimensions that it could not be economically fabricated. As an example, the radiator surface area in contact with the gas, if sulfur hexafluoride is employed, is about five times as great as that required in an oil filled transformer to achieve the same heat dissipation with the same volumetric flow.

As an alternative, it was found to be necessary to vary the velocity of the gas in order to achieve effective heat dissipation. Although perhaps more economical than major variation in the surface areas of the radiator, the necessary increase in fan capacity to increase the velocity of heavy gases such as sulfur hexafluoride was also undesirable from the standpoint of cost as well as an increase in fan noise, and the increase in the electrical power required to operate the gas circulation fan resulted in a disproportionately large increase in the total losses to be dissipated in the radiator.

As a further disadvantage, the radiators could not readily be removed from the transformer tank to facilitate shipment, because of the pressure of insulating gas in the tank, unless large and cumbersome valves were employed in the conduits connecting the radiator to the transformer tank.

It is therefore an object of this invention to provide an improved cooling arrangement for dielectric gas insulated electrical apparatus.

Another object of the invention is to provide a cooling arrangement for electronegative gas insulated electrical apparatus characterized by a reduction in circulation power required for the gaseous insulation, as compared with the previously employed gas to air radiator arrangements.

Still another object of this invention is to provide a cooling arrangement for electronegative gas insulated electrical apparatus in which the internal surface area of the external radiator is not a function of the properties of the gaseous insulating medium of the apparatus.

A further object is to provide a cooling arrangement for electronegative gas insulated electrical apparatus in which the external radiator may be readily separated from the transformer tank to facilitate shipment without losing gas pressure within the apparatus tank and without the necessity for uneconomical valves.

Briefly stated, in accordance with the preferred aspects of the present invention, we provide a cooling arrangement for electrical apparatus, such as transformers and the like, of the type immersed in a dielectric gas filled enclosure. The cooling arrangement comprises a sealed circulation system having a first heat transfer means within the enclosure, and a second heat transfer means external of the enclosure. Conduit means are provided interconnecting the heat transfer means to provide a continuous circulation path for a volatile liquid refrigerant partly filling the system, and means are provided to prevent entrained liquid from flowing into the external heat transfer means.

While the specification concludes with claims particularly pointing out and distinctly claiming the subject matter which we regard as our invention, it is believed that the invention may be better understood from the following description taken in connection with the accompanying drawings.

Figure 2:
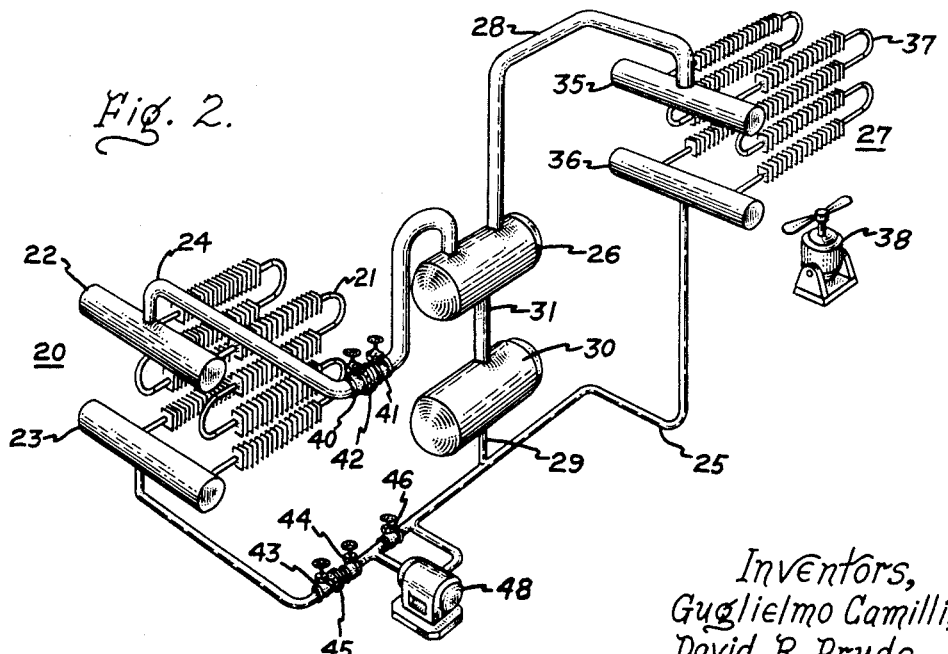
Figure 3:
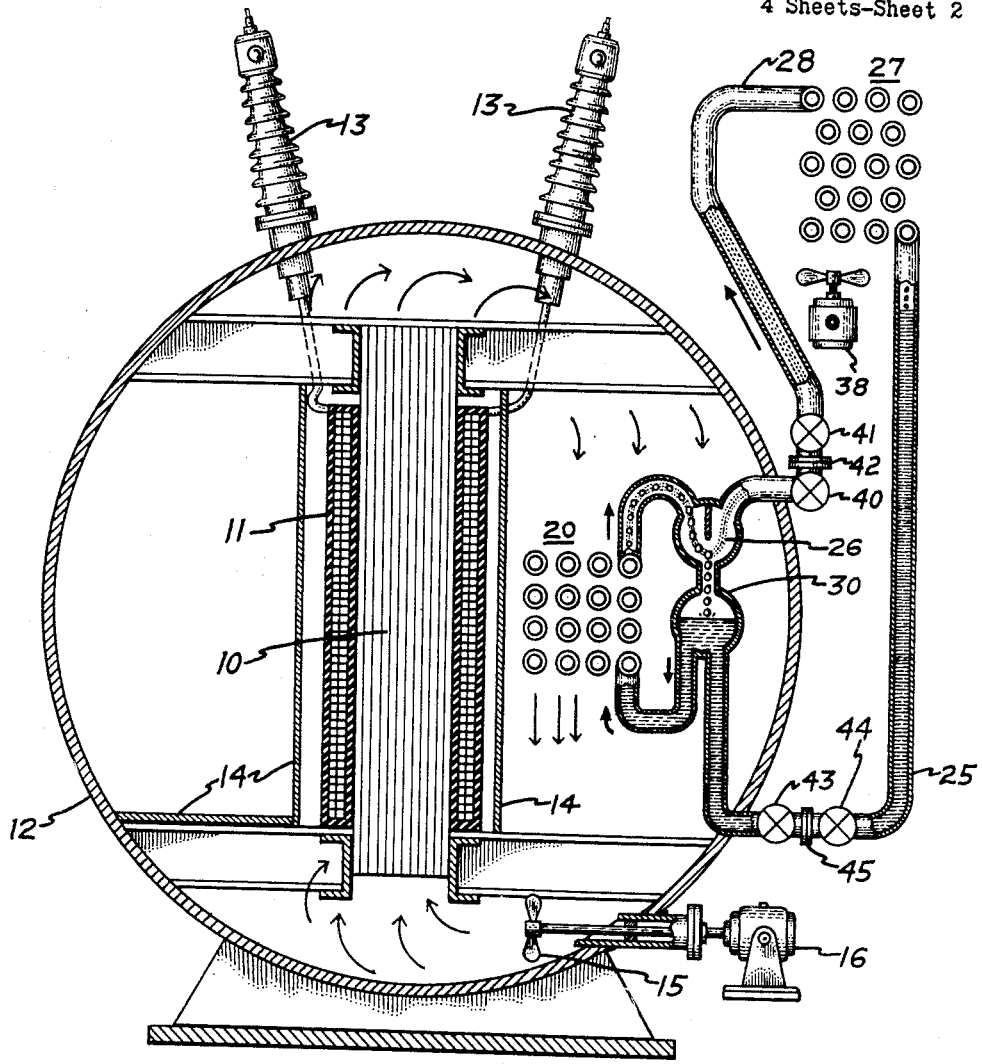
Figure 4:
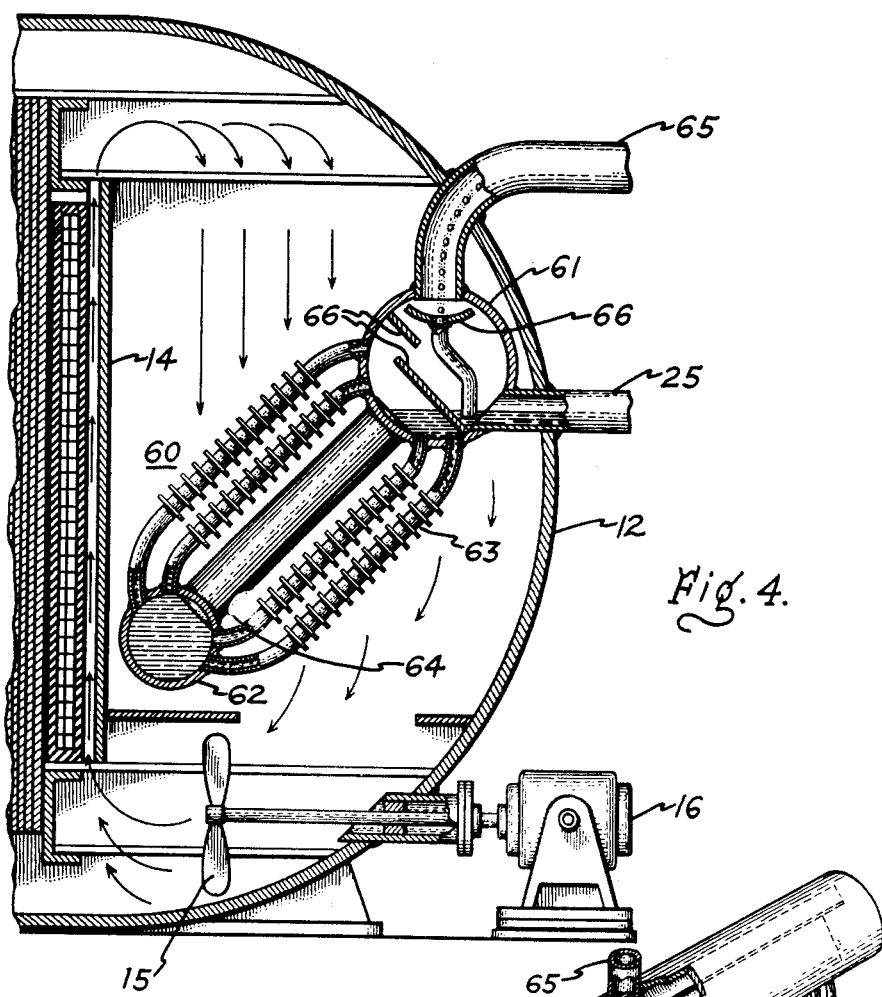
Figure 5:
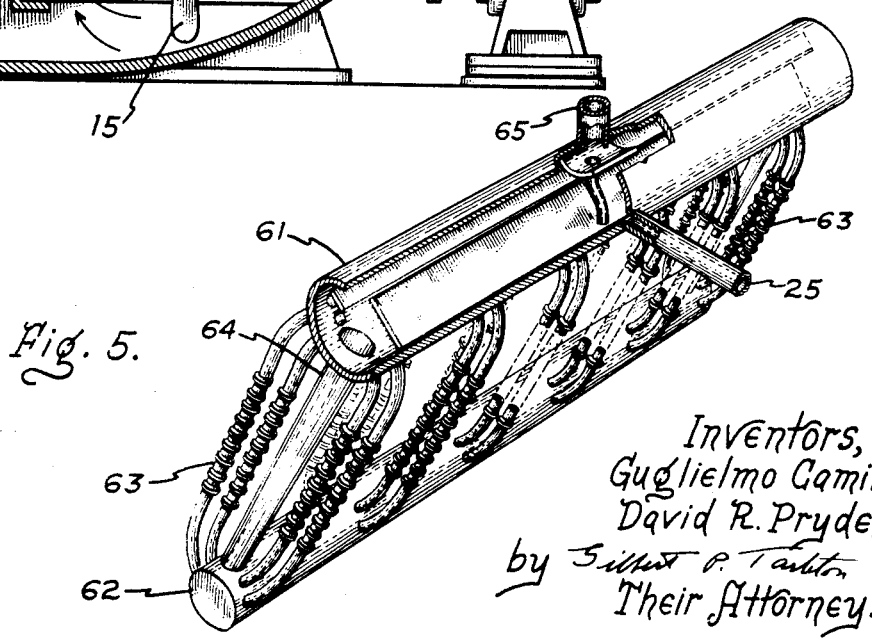
Figure 6:
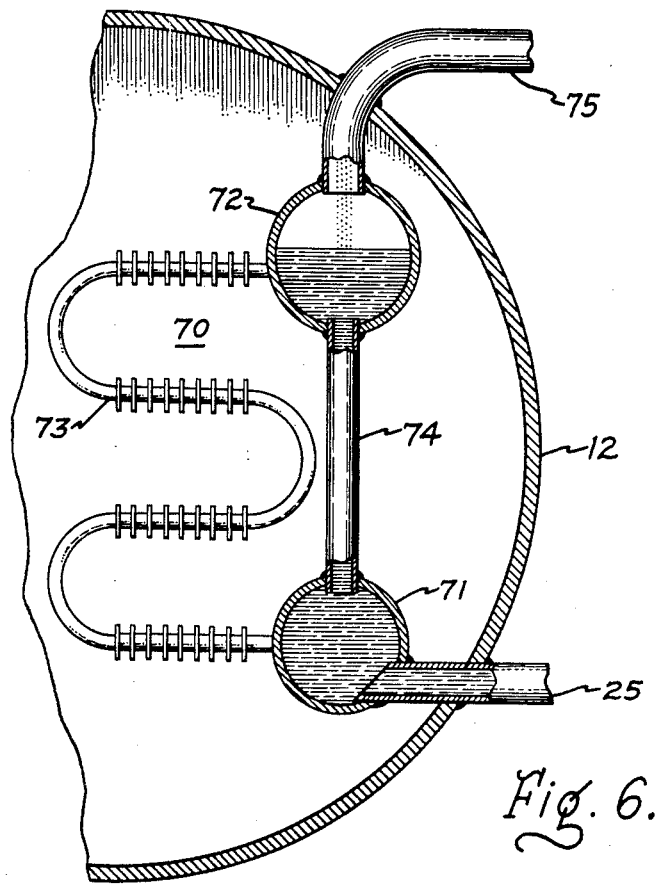
Figure 7:
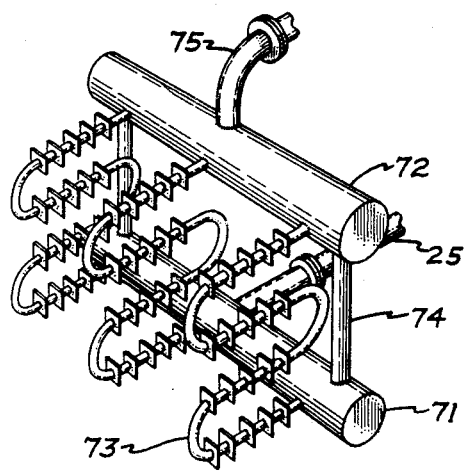

In the drawing:

Fig. 1 is a cross-sectional view of a transformer including a cooling arrangement in accordance with the invention, Fig. 2 is a perspective schematic illustration of the cooling arrangement of Fig. 1, Fig. 3 is a cross-sectional view of a transformer including a modified form of the cooling arrangement of Fig. 1, Fig. 4 is a cross-sectional view of a portion of a transformer, and illustrating another modified form of the cooling arrangement within the transformer, Fig. 5 is a perspective partially cross-sectional view of the internal radiator of the arrangement of Fig. 4, Fig. 6 is a cross-sectional view of a portion of a transformer and illustrating still another modified form of the internal cooling arrangement within the transformer and, Fig. 7 is a perspective view of the internal radiator of the transformer of Fig. 6.

Referring now to the drawings, and more specifically to Fig. 1, therein is illustrated a transformer comprising a magnetic core 10 having winding legs surrounded by an electric winding 11 or windings. Any conventional arrangements may be employed for these structures. The core and winding are rigidly mounted in an electronegative gas filled tank 12, the tank preferably having a circular cross section in order to provide mechanical strength, since the gas within the tank may be pressurized to achieve greater electrical breakdown strength. The tank is also conventionally supplied with a plurality of electrical insulating bushings 13 extending therethrough to facilitate interconnection between winding and external circuits.

A plurality of baffles 14 are provided within the tank 12 to direct gas from a fan 15 through the core and winding, the gas flow preferably being upward through the core and windings and downward adjacent at least one side of the tank, as indicated by the arrows of Fig. 1. The fan motor 16 for fan 15 may be disposed externally of the tank and connected to the fan by a gasketed shaft, as shown in the drawing, or it may be disposed within the tank.

A radiator 20 is disposed within the tank 12 in a position such that the electronegative gas is forced therethrough by the fan 15. The cylindrical shape of the tank facilitates such location of the radiator, since the radiator may occupy otherwise unused space adjacent the arcuate sides of the tank. As illustrated more clearly in Fig. 2, the radiator 20 may comprise a plurality of finned tubes 21 having convolutions and extending between an upper header 22 and a lower header 23. A conduit 24 extends from the upper header, and a conduit 25 extends from the lower header. Referring again to Fig. 1, the conduit 24 extends through the wall of the tank 20 and is connected to a trap 26. The conduit 25 similarly extends through the wall of the tank, and is connected to an external radiator 27. A conduit 28 extends between the trap 26 and the radiator 27.

A conduit 29 connected to the conduit 25 extends to the bottom of a surge tank 30, and another conduit 31 extends from the top of the surge tank to the trap 26. The trap 26 is arranged so that any liquid passing through the conduit 24 toward the external radiator 27 will be deflected into the surge tank 29.

The external radiator 27, which may be more clearly seen in Fig. 2, may be comprised of an upper header 35 into which the conduit 28 extends, and a plurality of finned tubes 37 having convolutions and extending between the upper header 35 and lower header 36. A fan 38 is provided to force air over the tubes 37 of the external radiator.

As illustrated in Figs. 1 and 2, a pair of valves 40 and 41 may be provided in the conduit 24 externally of the tank 12, and the valves 40 and 41 may be separated by a flanged connector 42. Similarly, a pair of valves 43 and 44, separated by a flanged connector 45, may be provided in the conduit 25 between the tank 12 and the surge tank conduit 29. Another valve 46 may be provided in the conduit 25 to divert liquid flow in the conduit 25 through by-pass conduits 47 connected to a pump 48.

The valves 40, 41, 43 and 44 have been provided in order that the external circulation system including the radiator 27 may be readily removed from the tank at the connectors 42 and 45 without loss of fluid in the system. In this arrangement, the trap 26 and surge tank 30 are also separate from the tank with the external radiator. In a modified arrangement, as illustrated in Fig. 3, the surge tank 30 and trap 26 are disposed within the tank 12, and may serve as the lower and upper headers respectively of the internal radiator 20. The valves 40 and 41 and connector 42 are disposed externally of the tank in the conduit 28, and valves 43 and 44 and connector 45 are disposed in the conduit 25 externally of the tank. The arrangement of Fig. 3 has the advantage that removal of the external radiator, such as for shipment, does not involve removal of the surge tank and trap.

Referring again to Fig. 1, the cooling system, which includes the internal and external radiators, surge tank and interconnecting conduits, is partly filled with a volatile liquid coolant 50. The coolant is also preferably a good dielectric material, in order that accidental leakage of the material into the transformer tank will not result in reduction of the dielectric strength of the transformer insulation.

In the cooling cycle of the present invention, heat generated in the core and windings of the transformer is given up to the insulating and cooling gas within the transformer tank. The heated gas is forced through the fins of the internal radiator 20, and the heat transferred to the liquid 50 through the walls of the internal radiator results in the boiling of the liquid coolant. The vapors rising through the conduit 24 are relieved of any entrained liquid in the trap 26, and pass through the conduit 28 to the external radiator 27. The liquid separated from the vapors is returned by gravity through conduit 31 to the surge tank 30. This separation of liquid from the vapors is necessary in order that entrained liquid does not enter the external radiator and thereby decrease the cooling efficiency. The heat of the vapors is transferred to the air forced through the fins of the external radiator, resulting in the condensation of the vapors, and the condensed fluid in the radiator flows downward in conduit 25.

The surge tank 30 is provided connected to the conduit 25 in order to compensate for volume changes of the cooling liquid resulting from heating and cooling. The surge tank 30 also serves to maintain the desired liquid level in the internal radiator for efficient cooling.

As a result of friction losses in the vapor side of the circulation system, the liquid 51 level in the end of the conduit 25 connected to the external radiator 27 will be higher than the liquid level in the surge tank and internal radiator. This static liquid head in the return conduit furnishes the motivating force necessary to circulate the vapor from the internal radiator to the external radiator against the friction losses in the conduits. In order that the heat transfer efficiency is not reduced in the external radiator by the presence of liquid, it is necessary that the external radiator be above the top liquid level in the conduit 25. It is also necessary, however, that the external radiator be as low as possible in order to reduce interference with electrical connections to the transformer. Therefore, in this arrangement, it is preferred that the bottom of the external radiator is above the liquid level in the internal radiator (and surge tank) a distance H (in feet) substantially equal to:

$$H = \frac{484 \times 10^{-6} \times f \times W^2}{d_g \times d_1 \times D^5} \times L$$

Where $f$ is the friction factor (a function of the Reynolds number), $W$ is the vapor flow in the system in lbs./hr., $d_g$ is the density (lbs./ft.$^3$) of the vapor in the system, $d_1$ is the density (lbs./ft.$^3$) of the liquid refrigerant, $D$ is the effective diameter of the conduits in feet, and $L$ is the effective length of the vapor circuit in feet.

In the manufacture of a transformer having the cooling arrangement of this invention, it may be preferred, in order to simplify fabrication of the components, that the internal and external radiators have similar construction (i.e., the same diameter tubes, and the same number of fins per inch on the tubes). We have found that when the vapors of the liquid refrigerant have a high heat transfer coefficient and the electronegative gas in the transformer tank is forced through the fins of the internal radiator at the same full velocity as the air is forced through the fins of the external radiator, the ratio of heat exchange surfaces is approximately equal:

$$\frac{A_1}{A_e} = \frac{\dfrac{1}{h_e\sqrt{\dfrac{\rho_i}{\rho_e}}} + \dfrac{1}{h_v}}{\dfrac{1}{h_e} + \dfrac{1}{h_v}}$$

Where $A_i$ is the surface area of the internal radiator exposed to the gas, $A_e$ is the surface area of the external radiator exposed to air, $h_e$ is the air to surface heat transfer coefficient of the external radiator, $h_v$ is the vapor to internal surface heat transfer coefficient of the sealed coolant system, $\rho_i$ is the density of the gas, and $\rho_e$ is the density of air.

Referring now to Figs. 4 and 5, the internal radiator 60 may be comprised of an upper header 61 disposed above a lower header 62, the headers being joined by a plurality of finned tubes 63. One or more return conduits 64 also join the headers, for example as illustrated, one of the return conduits 64 being located at each end of the headers. The conduit 65, which is connected to the upper portion of the external radiator (not shown for the sake of clarity) as the conduit 28 of Fig. 1, is connected to the top of the upper header 61, and the conduit 25 which is connected to the lower portion of the external radiator (not shown) as in Fig. 1, is connected to the side of the upper header 61. Baffles 66 may also be provided within the upper header to insure the removal of entrained liquids from the vapor, although when the flow of coolant is sufficiently slow, as when no forced circulation of coolant is employed, the entrained liquids flowing into the upper header return through the return conduit to the lower header without the provision of baffles.

In this arrangement, heat transferred from the transformer gas effects the boiling of the coolant in the finned tubes 63. Vapors then rise through the tubes to the upper header 61, and thence through the conduit 65 to the external radiator. Liquid entrained in the vapor is removed in the upper header, and this liquid and the liquid returning from the external radiator through conduit 25 return to the lower header 62 through the return conduits 64. Since the return conduits have no fins, the transfer of heat to the liquid in these conduits is negligible, and there is little or no boiling of the liquid therein that may interfere with the return of the liquid to the lower header.

In another modification of the cooling arrangement, as illustrated in Figs. 6 and 7, the internal radiator 70 is comprised of a lower header 71 disposed directly below an upper header 72. A plurality of externally finned tubes 73 having convolutions extend between the upper and lower headers, and as in the arrangement of Figs. 4 and 5, substantially straight return conduits 74 are also provided extending between the upper and lower headers. The conduit 75 connecting the internal radiator to the upper portion of the external radiator (not shown) is connected to the upper header 72, while the conduit 25 returning liquid from the external radiator is connected to the lower header 71. In this arrangement, no baffles are shown in the upper header, since when the flow of liquid through the internal radiator is sufficiently slow the entrained liquid flows back to the lower header without the necessity of any baffles.

In the arrangements of Figs. 4-7, the top level of liquid coolant in the internal radiator is in the upper header. The return conduits and headers have sufficient size that no additional surge tank is necessary to maintain the liquid level. While the external radiator has not been illustrated in these figures, it will be obvious that the external radiator should be positioned at a level above that of the internal radiator to permit return of the condensed liquid to the internal radiator. The limitation on the minimum height of the external radiator to overcome system friction is not present in these modifications, as it was in the arrangement of Fig. 1, however, since the return conduits in the internal radiators have sufficient capacity and height to overcome friction losses.

A comparison between the two-stage cooling arrangement of the present invention and the previously employed gas to air type is presented in the data of Table I.

Table I

| | Gas-to-air type | Two-stage type |
|---|---|---|
| Heat load _____ B.t.u./hr__ | 153,000 | 153,000 |
| Ambient temperature _____ ° C__ | 40 | 40 |
| Gas circulation rate _____ c.f.m__ | 1,200 | 1,200 |
| Gas velocity over coils _____ ft./min__ | 2,268 | 350 |
| Air velocity over coils _____ ft./min__ | 350 | 350 |
| Area of external radiator _____ ft.²__ | 1,500 | 1,040 |
| Area of internal radiator _____ ft.²__ | | 533 |
| Power of gas fan _____ H.P__ | 4.0 | 1.0 |
| Gas pressure drop in system__inches of water__ | 3.5 | 0.8 |

In the example of Table I, it is to be noted that the external radiator area of the two-stage type of the present invention is about ⅔ of the external radiator area of the previously employed gas-to-air type. Since the internal radiator of the two-stage type is located in unused space within the transformer tank, the additional internal radiator does not increase the floor space requirements of the transformer. The space required for the external surge tank and trap (if used) is small, since the internal capacity of the cooling system is small (e.g., in the example of Table I the cooling system required only 60 lbs. of liquid refrigerant), so that the floor space required for the transformer having two-stage cooling according to the present invention is less than that required for the previously employed gas-to-air type. The reduction in floor space is increased in the arrangements of Figs. 3-7, since no external traps or tanks are employed.

It is also to be noted from the data of Table I that the two-stage type of cooling arrangement requires only about 25% of the gas fan power required in the gas-to-air type, and the gas pressure drop in the transformer is also considerably reduced.

Aside from the decrease in floor space requirements and substantial decrease in power required for the gas fan, the two-stage arrangement of this invention has the additional advantage that the parts of the cooling system external of the transformer tank may be readily removed to facilitate shipment. In the example of Table I, it is noted that in both types of cooling arrangements, the gas circulation rate over the radiator coils is 1200 cubic feet per minute. In the two-stage arrangement, this circulation occurs entirely within the transformer tank, while in the gas-to-air type the high flow of gas must pass through external conduits. Thus, in the gas-to-air type, large ducts were required to convey the gas to the external radiator. In the gas-to-air type, due to the large conduits that were required, it was unfeasible to provide the necessary large valves to permit disconnection of the radiator without loss of pressure in the transformer tank. In the two-stage type, however, in the above example, the circulation rate of the liquid refrigerant is only about 2,000 lbs. per hour, and consequently relatively small conduits may be employed. This facilitates provision of valves to permit disconnection of the external portions of the system. In addition, the disconnection does not affect the insulating and cooling gas within the transformer tank, and the tank may thus be sealed, as by welding, without impairing the ease of removing the external radiator.

Previous reference has been made to the desirability that the liquid coolant be a good dielectric material in order that inadvertent leakage into the transformer tank will result in no harmful effects to the transformer. Mention has also been made to the desirability that the material have a high heat transfer coefficient. It is also desired that the material boil at a temperature within the normal operating temperature of the transformer. It has been found that trichloromonofluoromethane which is an electronegative material, boils at 24° C., and has a high heat transfer coefficient, may be employed satisfactorily at the liquid coolant. It will be obvious, of course, that other material having the above stated characteristics may also be employed without departing from the spirit and scope of the invention.

When very high heat transfer characteristics are necessary, it may be desirable to sacrifice the dielectric strength and use a non-freezing liquid coolant not necessarily having good dielectric strength. Mixtures of liquid coolants may also be employed.

It will be understood, of course, that while the forms of the invention herein shown and described constitute preferred embodiments of the invention, it is not intended herein to illustrate all of the possible equivalent forms or ramifications thereof. It will be understood that the words employed are words of description rather than of limitation, and that various changes may be made without departing from the spirit or scope of the invention herein disclosed, and it is intended in the appended claims to cover all such changes as fall within the true spirit and scope of the invention.

What we claim as new and desire to secure by Letters Patent of the United States is:

1. A cooling arrangement for electric apparatus immersed in a dielectric gas filled enclosure comprising a sealed fluid circulation system having first heat transfer means within said enclosure, second heat transfer means external of said enclosure, first conduit means and return conduit means joining said heat transfer means, a volatile liquid partially filling said system, and means inhibiting the passage of liquid through said first conduit means to said second heat transfer means said first and second heat transfer means each having a high temperature end and a low temperature end, and the inhibiting means comprising an upper receptacle and a lower receptacle, said upper receptacle being connected at one area thereof to the high temperature end of said first heat transfer means and connected at another area thereof to said second heat transfer means at the high temperature end thereof, and a portion of said receptacle between the connections being free of said sealed fluid that has condensed to the liquid state, said lower receptacle being connected to the low temperature end of said first heat transfer means and to the low temperature end of said second heat transfer means, a condensed fluid returning conduit connecting said upper and lower receptacles, and said second heat transfer means being located above said first heat transfer means, whereby liquid entrained in said sealed fluid as it is passing from said first heat transfer means to said second heat transfer means will be condensed in said upper receptacle in the liquid-free portion thereof, and the condensed liquid will then pass through said liquid returning conduit and through said lower receptacle to the low temperature end of said first heat transfer means without entering said second heat transfer means.

2. Electrical apparatus comprising an electrical device disposed within an electronegative gas filled tank, said tank having a substantially circular cross section, first heat transfer means disposed within said tank and spaced from said device, circulation means in said tank for circulating said gas in heat exchange relationship with said device and first heat transfer means, second heat transfer means disposed externally of said tank, conduit means joining said heat transfer means to form a sealed system, a volatile fluid partially filling said system, and means in said system inhibiting flow of said liquid through said conduit means from said first heat transfer means to said second heat transfer means said first and second heat transfer means each having a high temperature end and a low temperature end, and the inhibiting means comprising an upper receptacle and a lower receptacle, said upper receptacle being connected at one area thereof to the high temperature end of said first heat transfer means and connected at another area thereof to said second heat transfer means at the high temperature end thereof, a portion of said upper receptacle between the connections being free of said volatile fluid that has condensed to the liquid state, said lower receptacle being connected to the low temperature end of said first heat transfer means and to the low temperature end of said second heat transfer means, a condensed liquid returning conduit connecting said upper and lower receptacles, said second heat transfer means being located above said first heat transfer means, whereby liquid entrained in said volatile fluid as it is passing from said first heat transfer means to said second heat transfer means will be condensed in said upper receptacle in the liquid-free portion thereof, and the condensed liquid will then pass through said liquid returning conduit and through said lower receptacle to the low temperature end of said first heat transfer means without entering said second heat transfer means.

3. Electrical apparatus comprising an electrical device centrally disposed in an electronegative gas filled tank, said tank having a substantially circular cross section, circulation means in said tank for circulating said gas upwardly through said device and downwardly along the sides of said tank, first heat exchange means disposed within said tank in the path of downward flow of said gas, second heat transfer means disposed externally of said tank, first and second conduit means joining said heat transfer means to form a sealed system, a volatile fluid partially filling said system, said first conduit means being disposed to pass vapors from said first heat transfer means to said second heat transfer means, said second conduit means being disposed to return condensed vapors to said first heat transfer means, and means inhibiting passage of liquid through said first conduit means to said second heat transfer means said first heat exchange means and said second heat transfer means each having a high temperature end and a low temperature end, and the inhibiting means comprising an upper receptacle and a lower receptacle, said upper receptacle being connected at one area thereof to the high temperature end of said first heat exchange means and connected at another end thereof to said second heat transfer means at the high temperature end thereof, a portion of said upper receptacle between the connections being free of said volatile fluid that has condensed to the liquid state, said lower receptacle being connected to the low temperature end of said first heat exchange means and to the low temperature end of said second heat transfer means, a condensed liquid returning conduit connecting said upper and lower receptacle, said second heat transfer means located above said first heat exchange means, whereby liquid entrained in said volatile fluid as it is passing from said first heat exchange means to said second heat transfer means will be condensed in said upper receptacle in the liquid-free portion thereof, and the condensed liquid will then pass through said liquid-returning conduit and through said lower receptacle to the low temperature end of said first exchange means without entering said second heat transfer means.

4. Apparatus as recited in claim 1 in which said upper and lower receptacles are located externally of said gas-filled enclosure, and said first conduit means and said return conduit means are separately coupled to said gas-filled enclosure by flanged connector means.

5. Apparatus as recited in claim 1 in which said sealed fluid is a dielectric material compatible with said dielectric gas, whereby leakage of said sealed fluid to said gas-filled enclosure will not result in a reduction of the dielectric strength of said dielectric gas.

6. Apparatus as recited in claim 1 in which baffle means is disposed in said upper receptacle.

7. Apparatus as recited in claim 1 in which said upper and lower receptacles comprise header members located within said gas-filled enclosure, and said first heat transfer means comprises a plurality of externally finned tubes having convolutions extending between said headers.

8. Electrical apparatus comprising an electrical device disposed in an enclosure, an insulating and cooling fluid in said enclosure surrounding said electrical device, heat absorbing means in said enclosure for transferring heat from said fluid to heat dissipating means located outside of said enclosure, said heat absorbing and heat dissipating means being connected by first and second conduit means so as to form a closed system, said closed system being occupied by a heat transfer fluid existing in liquid and vapor phases, said heat transfer fluid being circulated through said system only by means of a thermal head caused by the boiling of said liquid phase in said heat absorbing means and the condensing of said vapor phase in said heat dissipating means, said first conduit means connecting said heat absorbing and heat dissipating means at their high temperature ends, and said second conduit means connecting said heat absorbing and heat dissipating means at their low temperature ends, and said first and second conduit means being connected between said heat absorbing and dissipating means by a liquid bypass means that prevents liquid entrained in the gas phase of said heat transfer fluid from passing from said heat absorbing means to said dissipating means, said liquid by-pass means comprising an upper receptacle and a lower receptacle, said upper receptacle being connected at one area thereof to the high temperature end of said heat absorbing means and connected at another area thereof to said heat dissipating means at the high temperature end thereof, a portion of said upper receptacle between the connections being free of said heat transfer fluid that has condensed to the liquid state, said lower receptacle being connected to the low temperature end of said heat absorbing means and to the low temperature end of said heat dissipating means, a condensed liquid returning conduit connecting said upper and lower receptacles, and said heat absorbing means being located above heat absorbing means, whereby liquid entrained in said heat transfer fluid as it is passing from said heat absorbing means to said heat dissipating means will be condensed in said upper receptacle in the liquid-free portion thereof, and the condensed liquid will then pass through said liquid returning conduit and through said lower receptacle to the low temperature end of said heat absorbing means without entering said heat dissipating means.

9. Apparatus as recited in claim 8 in which baffle means is disposed in said upper receptacle.

10. Apparatus as recited in claim 9 in which said baffle means comprises a vertical partition that divides said upper receptacle into two horizontally spaced compartments.

References Cited in the file of this patent

UNITED STATES PATENTS

| | | |
|---|---|---|
| 96,157 | Smeeth | Oct. 26, 1869 |
| 1,484,258 | Fenton | Feb. 19, 1924 |
| 1,703,965 | Shipley | Mar. 5, 1929 |
| 2,032,287 | Kitzmiller | Feb. 25, 1936 |
| 2,701,455 | Kleist | Feb. 8, 1955 |
| 2,791,101 | Zearfoss | May 7, 1957 |
| 2,845,472 | Narbutovskih | July 29, 1958 |

FOREIGN PATENTS

| | | |
|---|---|---|
| 89,935 | Germany | Mar. 18, 1896 |
| 374,828 | Great Britain | 1932 |

OTHER REFERENCES

Camilli: "Gas Insulated Transformers," published in General Electric Review, May–July 1956. Pages 41–44 relied on.